Oct. 22, 1929.  J. A. BRIDGES  1,732,923
PLOW ATTACHMENT FOR DISK CULTIVATORS
Original Filed May 3, 1927    2 Sheets-Sheet 1
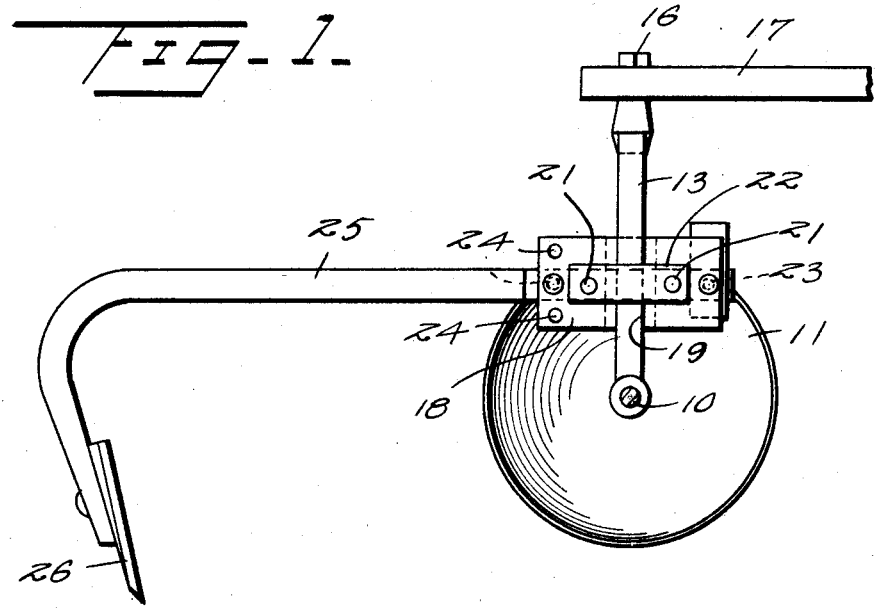
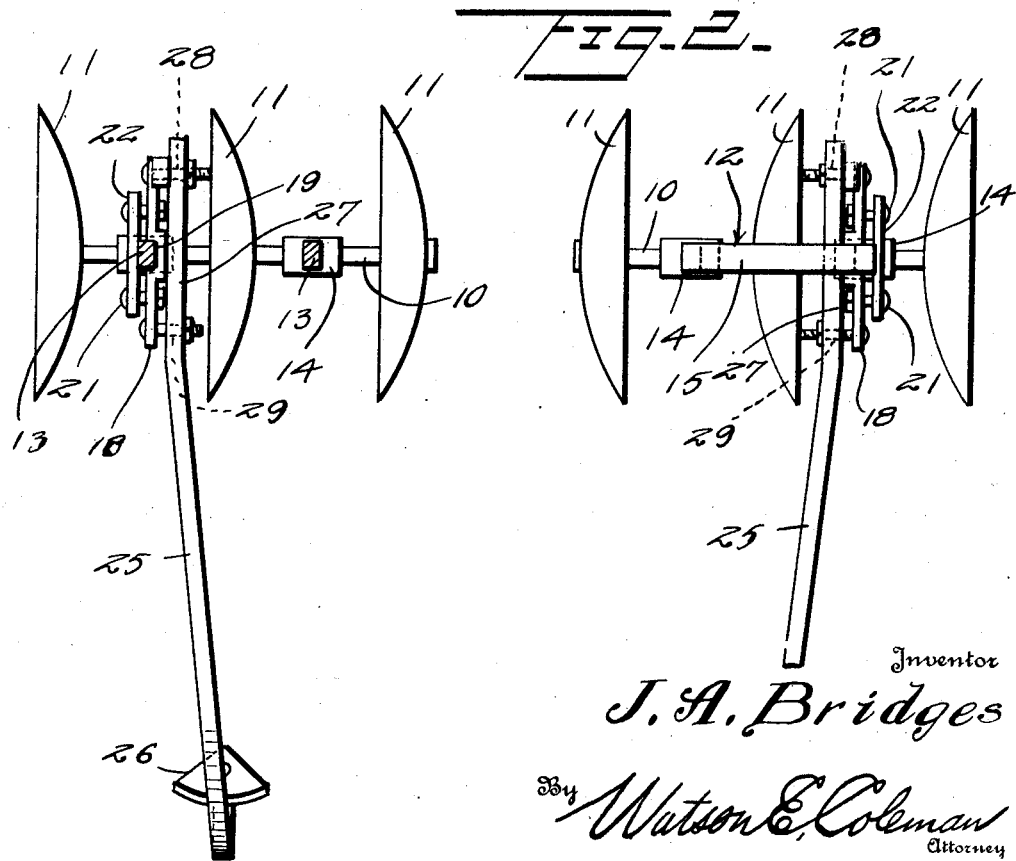
Inventor
J. A. Bridges
By Watson E. Coleman
Attorney Oct. 22, 1929.  J. A. BRIDGES  1,732,923
PLOW ATTACHMENT FOR DISK CULTIVATORS
Original Filed May 3, 1927  2 Sheets-Sheet 2
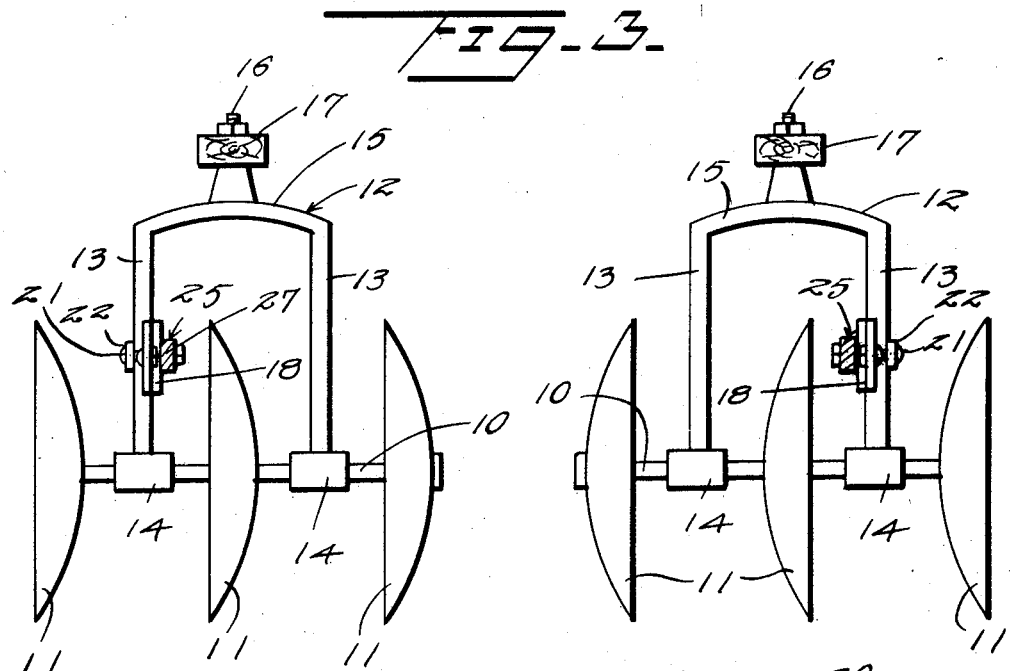
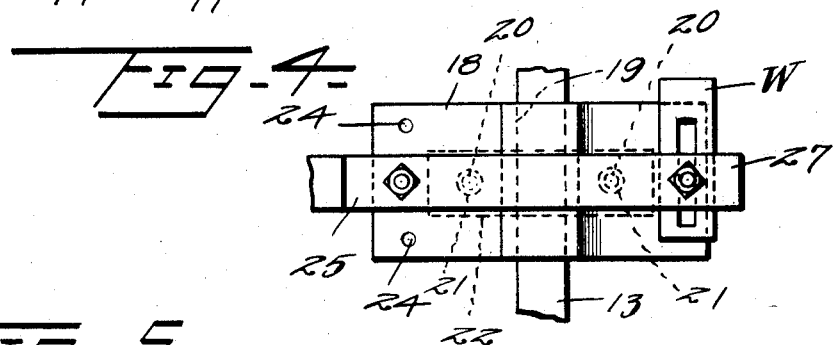
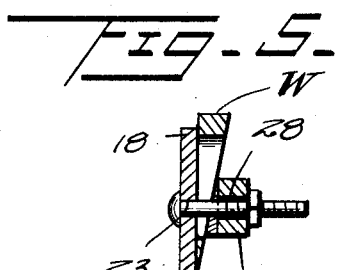
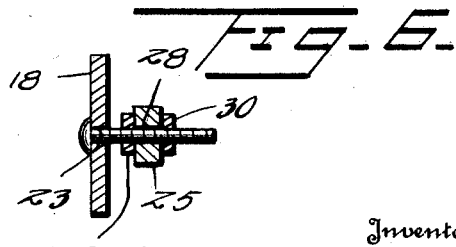
Inventor
J. A. Bridges
By Watson E. Coleman,
Attorney Patented Oct. 22, 1929

1,732,923

UNITED STATES PATENT OFFICE

JOHN A. BRIDGES, OF CHANUTE, KANSAS

PLOW ATTACHMENT FOR DISK CULTIVATORS

Refiled for abandoned application Serial No. 188,521, filed May 3, 1927. This application filed May 9, 1929. Serial No. 361,815.

This invention relates to a plow attachment for disk cultivators and more particularly to a device which may be attached to the usual disk cultivator employed for cultivating standing crops to either throw earth toward or away from the standing crop, as may be desired.

An important object of the invention is to produce a device of this character which may be applied to disk cultivators of different types and may be readily adjusted to bring the plow blade to the proper depth and angle for operation.

A further object of the invention is to produce a device of this character which may be very readily and cheaply produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a vertical sectional view through a gang element of a disk cultivator having a plow attachment constructed in accordance with my invention.

Figure 2 is a horizontal sectional view showing the arrangement of the plow beams.

Figure 3 is a vertical sectional view taken through the plow beams.

Figure 4 is a detail side elevation showing a wedge inserted to permit angular adjustment of the beam with relation to the mounting plate.

Figure 5 is a vertical sectional view through the wedge structure.

Figure 6 is a view showing a modified method of providing the transverse adjustment of the plate.

Referring now more particularly to the drawings, the numeral 10 generally indicates the shafts of the disk gangs of a tandom disk cultivator and 11 the disks thereof. In the usual tandom disk cultivator, these disks are three in number and the shaft is secured in position to the cultivator frame by an inverted U-shaped standard 12, the lower ends of the arms 13 of which are secured to or have bearings for the shaft, as indicated at 14, and the cross bar 15 of which is adapted for connection, as at 16, to the cultivator frame, generally designated at 17.

In accordance with my invention, I provide a plate 18 adapted to flatly abut one face of the bar and having a groove 19 in its bar confronting face in which the bar may seat. At opposite sides of this groove, the plate 18 is apertured at 20 for the passage of securing bolts 21, by means of which the plate may be connected with a clamping bar 22 arranged at the opposite side of the arm 13 of the yoke.

Adjacent its forward end, the plate 18 has a centrally located opening 23, while adjacent the rear end thereof, it is provided with a substantially vertically disposed series of openings 24 equally radially spaced from the opening 23. A plow beam 25 is provided, to which the plow 26 may be secured in any suitable manner. The forward end of this beam has an angularly deflected portion 27 adapted to confront the plate 23 and this angularly deflected portion has openings 28 and 29 spaced similarly to the spacing of the openings 23 and 24.

In the use of the attachment, the plate 18 is first secured in position upon the arm 13 and a bolt passed through the forward opening 28 of the beam and the opening 23. The plate having been properly vertically adjusted, the beam of the plow is then connected with the plate by a bolt passed through the openings 29 and 24, the opening 24 being selected, which places the plow 26 in proper relation to the ground. The position of the plow blade with relation to the path of the disks may be then determined by adjusting the space between the forward end of the angular extension and the plate 18. This may be accomplished either by the use of wedges W, as suggested in Figures 4 and 5, or by the use of nuts 30 placed upon the bolt 31 and passed through the openings 28 and 23 between the beam and plate, as shown in Figure 6.

It will be obvious that by use of a construction of this character, the plow beam may be applied to the frame of the unit of practically any disk cultivator and the plow arranged at a desired depth and angle to this frame. The adjustability in attachment is necessary due to the fact that the frames of different makes of cultivators differ in their angles to the ground and furthermore in the arrangement of the arms with relation to the path of travel of the disks.

Since the construction hereinbefore set forth is capable of a certain range of change and modification without materially departing from the spirit of the invention, I do not limit myself to such specific structure except as hereinafter claimed.

I claim:

1. In combination with a cultivator disk unit embodying a substantially vertically extending standard, a plate and means whereby it may be secured in vertically adjusted position upon the standard, a plow beam, longitudinally spaced securing elements directed therethrough, an opening adjacent one end of said plate for the reception of one of said securing elements, a series of vertically spaced openings at the opposite end of the plate for the reception of the other of said securing elements and means for maintaining the forward end of the beam adjustably spaced from the plate.

2. In combination with a cultivator disk unit embodying a substantially vertically extending standard, a plate and means whereby it may be secured in vertically adjusted position upon the standard, a plow beam, longitudinally spaced securing elements directed therethrough, an opening adjacent one end of said plate for the reception of one of said securing elements and a series of vertically spaced openings at the opposite end of the plate for the reception of the other of said securing elements, the forward end of said beam being horizontally deflected at an angle to the remainder of the beam.

3. In combination with a cultivator disk unit embodying a substantially vertically extending standard, a plate and means whereby it may be secured in vertically adjusted position upon the standard, a plow beams, longitudinally spaced securing elements directed therethrough, an opening adjacent one end of said plate for the reception of one of said securing elements, a series of vertically spaced openings at the opposite end of the plate for the reception of the other of said securing elements and means for maintaining the forward end of the beam adjustably spaced from the plate, the forward end of said beam being horizontally deflected at an angle to the remainder of the beam.

4. In combination with a cultivator disk unit embodying a substantially vertically extending standard, a plate and means whereby it may be secured in vertically adjusted position upon the standard, a plow beam, longitudinally spaced securing elements directed therethrough, an opening adjacent one end of said plate for the reception of one of said securing elements, a series of vertically spaced openings at the opposite end of the plate for the reception of the other of said securing elements, and means interposed between the forward end of the beam and the plate for maintaining the forward end of the beam spaced from the plate.

In testimony whereof I hereunto affix my signature.

JOHN A. BRIDGES.